United States Patent [19]

Adelmann et al.

[11] 4,046,836
[45] Sept. 6, 1977

[54] POLYCARBONATE MOLDING MATERIALS

[75] Inventors: Siegfried Adelmann, Krefeld; Dieter Margotte, Krefeld-Fischeln; Josef Merten, Korschenbroich; Hugo Vernaleken, Krefeld, all of Germany

[73] Assignee: Bayer Aktiengesellschaft, Leverkusen, Germany

[21] Appl. No.: 648,992

[22] Filed: Jan. 14, 1976

[30] Foreign Application Priority Data

Jan. 28, 1975 Germany .............................. 2503336

[51] Int. Cl.$^2$ ...................... C08L 69/00; C08L 81/04
[52] U.S. Cl. .................... 260/860; 260/823; 260/DIG. 24
[58] Field of Search ................ 260/823, 860, DIG. 24

[56] References Cited

U.S. PATENT DOCUMENTS

| 3,221,080 | 11/1965 | Fox ......................................... 260/860 |
| 3,354,129 | 11/1967 | Edmonds et al. ...................... 260/79 |
| 3,742,085 | 6/1973 | Bialous ................................. 260/860 |
| 3,966,688 | 6/1976 | Campbell ........................ 260/823 X |

FOREIGN PATENT DOCUMENTS

| 2,211,957 | 9/1973 | Germany |
| 2,248,817 | 4/1974 | Germany |
| 962,941 | 7/1964 | United Kingdom |

*Primary Examiner*—Howard E. Schain
*Assistant Examiner*—W. C. Danison, Jr.
*Attorney, Agent, or Firm*—Gene Harsh; Lawrence S. Pope; Frederick H. Colen

[57] ABSTRACT

This invention relates to thermoplastic polycarbonate molding materials having improved flame resistance and hydrolysis resistance. These materials comprise intimate blends of aromatic high molecular weight polycarbonates and about 0.5 to 50 wt. % of polyphenylene sulphides. This invention also relates to a process for improving the flame resistance and hydrolysis resistance of aromatic polycarbonates by intimately blending them with about 0.5 to 50 wt. % polyphenylene sulphide.

10 Claims, No Drawings

POLYCARBONATE MOLDING MATERIALS

FIELD OF THE INVENTION

The invention relates to polycarbonate molding materials based on high, molecular weight, aromatic, thermoplastic polycarbonates containing about 0.5 - 50% by weight, preferably about 2 - 20% by weight, and especially about 0.5 - 10% by weight of polyphenylene sulphides, relative to the total weight of polycarbonate + polyphenylene sulphide.

BACKGROUND OF THE INVENTION

Because of their typical tough and elastic properties aromatic polycarbonates are employed in numerous industrial fields of use. An occasional disadvantage is the inadequate flame resistance for particularly special requirements, and the low resistance to hydrolysis. These disadvantages have hitherto made it difficult to employ polycarbonates in particularly special requirements in the field of the electrical industry and of domestic equipment. Thus, for example, housing components and instrument components of electrical machinery used at hot water temperatures must not only posses the customary high-impact properties but also high flame resistance and good resistance to hydrolysis (for example in the case of dishwashing machines, egg boilers, and the like).

Flameproof polycarbonates are known. They are prepared, inter alia, by conjoint use of halogen-containing dihydroxy compounds (for example, 2,2-bis-(3,5-dibromo-4-hydroxyphenyl)-propane or 2,2-bis-(3,5-dichloro-4-hydroxyphenyl)-propane) in preparing the polycarbonate. These halogen-containing polycarbonates, above certain halogen concentrations (bromine about 6% by weight, chlorine about 10% by weight) achieve classification V O (previously SE O) in the burning test according to Underwriter's Laboratories Subj. 94.

A disadvantage which manifests itself with these halogen-containing polycarbonates is, that the processing properties (flow characteristics) are markedly poorer than with pure aromatic polycarbonates based on 2,2-bis-(4-hydroxyphenyl)-propane (bisphenol A). The mechanical properties also do not reach the level usually associated with polycarbonate. A further disadvantage is the possible formation of hydrogen halide acids in the event of a fire, in which case inestimable consequential damage can arise through corrosion.

It was now the object of the present invention to provide polycarbonate molding materials which are free from halogen or have a low halogen content, which are distinguished by high flame resistance and which do not exhibit the disadvantages described above, such as poor flow and deteriorated mechanical properties.

It has now been found that additions of polyphenylene sulphide to pure aromatic polycarbonates raise the fire resistance of aromatic polycarbonates without loss of the good mechanical properties and of the processing properties. The oxygen index (according to ASTM-D 2863-70) which is a measure of the inflammability in a mixture of oxygen and nitrogen, is also markedly raised through the admixed polyphenylene sulphide. Thus, for example, a test specimen containing 5% by weight of polyphenylene sulphide attains an oxygen index of 0.30 while pure aromatic polycarbonate based on bisphenol A has an oxygen index of 0.24.

SUMMARY OF THE INVENTION

Accordingly, the subject of the present invention are polycarbonate molding materials based on high molecular aromatic thermoplastic polycarbonates, characterized in that they contain about 0.5 - 50% by weight, preferably about 2 - 20% by weight, and especially about 5 - 10% by weight of a polyphenylene sulphide, relative to the total weight of polycarbonate + polyphenylene sulphide. These molding materials have both adequate flame-resistant properties and, at the same time, good mechanical (for example tough and elastic) properties, good processability and good resistance to hydrolysis.

DETAILED DESCRIPTION OF THE INVENTION

The invention provides polycarbonate molding materials which are distinguished by these interesting combinations of properties which are not attained by conventional aromatic polycarbonates. Thus, for example, the combination of flame resistance, resistance to hydrolysis, good processing characteristics and good mechanical properties is of interest for a large number of fields of use, so that a range of new possible applications can be opened up thereby.

The surprising factor in the invention is in particular that outstanding resistance to hydrolysis by aqueous alkali and boiling water is achieved by even small amounts of the admixed polyphenylene sulphide. Thus, for example, a test bar (length 12 cm, width 1 cm, thickness 0.4 cm) based on bisphenol A breaks after only about 5 hours after storage in an aqueous alcoholic solution (pH 12) at 60° C under a flexural stress of 800 MPa, while a test bar of 90% by weight polycarbonate based on bisphenol A and 10% by weight of polyphenylene sulphide has not yet broken after 48 hours.

Even after prolonged periods of boiling in water, the impact strength values are substantially higher than for pure aromatic polycarbonate.

Aromatic polycarbonates in the sense of the present invention are to be understood as homopolycarbonates and copolycarbonates which are based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropylbenzenes as well as their nuclear-alkylated and nuclear-halogenated compounds. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846, in German Offenlegungsschriften (German Published Specifications) 1,570,703; 2,063,050; 2,063,052; 2,211,956 and 2,211,957, in French Patent Specification 1,561,518 and in the monograph "H. Schnell, Chemistry and Physics of Polycarbonates, Interscience Publishers, New York, 1964".

Preferred bisphenols are: 4,4-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5- dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cycloexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred bisphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those which are based on one or more of the bisphenols mentioned as being preferred. Particularly preferred copolycarbonates are those based on 2,2-bis-(4-hydroxyphenyl)-propane and one of the other bisphenols mentioned as being particularly preferred.

Further particularly preferred polycarbonates are those based solely on 2,2-bis-(4-hydroxyphenyl)-propane or 2,2-bis-(3,5-dimethyl-4-hydroxyphenyl)-propane.

The aromatic polycarbonates can be prepared according to known processes, such as, for example, according to the melt trans-esterification process from bisphenols and diphenyl carbonate, and the two-phase boundary process from bisphenols and phosgene, as described in the above-mentioned literature.

The aromatic polycarbonates can also be branched through incorporation of small amounts of polyhydroxy compounds, for example about 0.05 – 2.0 mol% (relative to the bisphenols employed). Polycarbonates of this nature are described, for example, in German Offenlegungsschriften (German Published Specifications) 1,570,533; 1,595,762; 2,116,974 and 2,113,347, British Patent Specification 1,079,821 and U.S. Pat. No. 3,554,514 (now U.S. Reissue No. 27,682). Some of the polyhydroxy compounds which can be used are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-(4,4'-dihydroxydiphenyl)cyclohexyl]-propane, 2,4-bis-(4-hydroxyphenyl-4-isopropyl)-phenol, 2,6-bis-(2'-hydroxy-5'-methyl-benzyl)-4-methyl-phenol, 2,4-dihydroxybenzoic acid, 2-(4-hydroxyphenyl)-2-(2,4-dihydroxyphenyl)-propane and 1,4-bis(4',4''-dihydroxy-triphenyl-methyl)-benzene.

The aromatic polycarbonates should as a rule have molecular weights $\overline{M}_w$ of about 10,000 to 200,000, preferably of about 20,000 to 80,000.

Polyphenylene sulphides in the sense of the invention are reaction products of polyhalogen compounds with alkali metal sulphides (according to U.S. Pat. No. 3,354,129) or of polyhalogeno-aromatics with sulphur and a metal sulphide (according to U.S. Pat. No. 2,513,188) or polymers of metal salts of halogenothiophenolates obtained under nitrogen at a polymerization temperature of 250°– 310° C (according to British Patent 962,941). The polyphenylene sulphides used are known, for example, as the commercial products RYTON® R 6 and RYTON® R 4 (from 1974) of Messrs. Phillips Petroleum Company, Delaware, U.S.A.

Polyphenylene sulphides in the sense of the invention are preferably the polymers derived from unsubstituted 1,4-phenylene (-$C_6H_4$-), the glass transition temperature of which is between about 85° C and about 95° C; polyphenylene sulphides with a substituted phenylene radical are equally suitable.

The homogeneous incorporation of the polyphenylene sulphides into polycarbonate may be effected in accordance with known processes, e.g. using a twin screw extruder, at about 250° – 290° C. The melt may be extruded to form a ribbon and subsequently granulated.

The polycarbonate molding materials according to the invention can, if appropriate, additionally contain stabilizers, dyestuffs or fillers or glass fibers in the usual amounts, and the good properties, achieved according to the invention, of the polycarbonate-polyphenylene sulphide mixtures can thereby be modified in the desired way. The homogeneity of the mixture and the good compatibility of the components of the mixture manifests itself in the excellent mechanical properties. A particular characteristic thereof is the weld-line strength (DIN 53,543), which can be used as a measure of the compatibility in assessing polymer blends and which, in the present instance, attains the values of one-phase systems.

The flame-resistant and hydrolysis-resistant polycarbonate molding materials according to the invention, in the form of powders or granules, can be converted, in accordance with the known processing methods, such as, for example, by injection molding and extrusion, to very diverse types of moldings. Molding materials of the above can be used for the manufacture of hydrolysis-resistant and impact-resistant moldings of low inflammability, such as are used, for example, in general instrument construction, precision engineering, electrical engineering and telecommunication, and also for the manufacture of semi-finished goods such as, for example, sheets, slabs, bars, profiles and the like.

The examples which follow are intended to explain the subject of the invention in more detail:

I. The aromatic polycarbonates used.
I.1 General instruction for the preparation of polycarbonates.

About 454 parts of 4,4'-dihydroxydiphenyl-2,2-propane and 9.5 parts of p-tert.-butylphenol are suspended in 1.5 l of water. The oxygen is removed from the reaction mixture in a 3-neck flask equipped with a stirrer and gas inlet tube, by passing nitrogen through the reaction mixture for 15 minutes while stirring. 355 parts of 45% strength sodium hydroxide solution and 1,000 parts of metylene chloride are then added. The mixture is cooled to 25° C. While maintaining this temperature by cooling, 237 parts of phosgene are added over a period of 120 minutes. An additional amount of 75 parts of a 45% strength sodium hydroxide solution is added after 15 – 30 minutes or after the absorption of phosgene has started. 1.6 parts of triethylamine are added to the resulting solution and the mixture is stirred for a further 15 minutes. A highly viscous solution is obtained, the viscosity of which is regulated by adding methylene chloride. The aqueous phase is washed with water until free from salt and alkali. The polycarbonate is isolated from the washed solution and dried. The polycarbonate has a relative viscosity of 1.29 – 1.30, measured in an 0.5% strength solution in methylene chloride at 20°. This corresponds approximately to a molecular weight of 32,000. The polycarbonate thus obtained is extruded and granulated.

A. An aromatic polycarbonate based on 2,2-bis-(4-hydroxyphenyl)-propane (bisphenol A), having a relative viscosity of $\eta_{rel} = 1.29$, $M_{LS} = 28,000$. The viscosities are measured at 25° C in methylene chloride at a concentration of 5 g/l ($M_{LS} =$ molecular weight determined by light scattering).

B. An aromatic polycarbonate based on 70 mol% of bisphenol A and 30 mol% of 2,2-bis-(3,5-dimethyl-4-hyroxyphenyl)-propane (tetramethylbisphenol A), having a relative viscosity of $\eta_{rel} = 1.28$, $M_{LS} = 31,000$.

C. An aromatic polycarbonate based on 95 mol% of bisphenol A and 5 mol% of 2,2-bis-(3,5-dibromo-4-hydroxyphenyl)-propane (tetrabromobisphenol A), having a relative viscosity of $\eta_{rel} = 1.31$, $M_{LS} = 39.000$.

II. The polyphenylene sulphides used.

II.1 The commercial products listed are employed as polyphenylene sulphides (D and E).

An example of the preparation of a polyphenylene sulphide to be used will be given additionally:

The polyphenylene sulphide can be prepared according to U.S. Pat. No. 3,354,129. For this purpose, 60 g of $Na_2S \cdot 9H_2O$ in 100 ml of N-methylpyrrolidone are heated to 190° C in an autoclave flushed with nitrogen. This initial heating removes the water of crystallization of the sodium sulphide. 36.7 g of p-dichlorobenzene are added to the solution. The solution is then kept in a closed autoclave for 44 hours at 231° C, 20 hours at 225° C and 24 hours at 260° C. A polymer which is dried after washing with water and acetone and can be converted to a hard film at 290° C is obtained. The melting point of the polyphenylene sulphide is between 275° and 285° C and the yield is about 80%.

D. RYTON® R 6 (from 1974), non-reinforced polyphenylene sulphide, glass transition temperature 94° C, melting point 289° C, density 1.34 g/cm³ (DIN 53 479), impact strength 8 kj/m² (DIN 53 453), notched impact strength 1 kj/m² (DIN 53 453), E. RYTON® R 4 (from 1974), polyphenylene sulphide reinforced with 40% by weight of glass fibers, density 1.66 g/cm³ (DIN 53 479), impact strength 15.7 kj/m² (DIN 53 453), notched impract strength 6.6 kj/m² (DIN 53 453).

EXAMPLES 1 – 4

The properties of the pure polycarbonates A, B and C without polyphenyl sulphide are described in Table 1, as are those of the polyphenylene sulphide RYTON® R 6.

EXAMPLE 5

2% by weight of polyphenylene sulphide D are admixed to pure polycarbonate A in a twin screw extruder at 250° C. The mixture is extruded and granulated. Moldings of this mixture are injection-molded at 270° C. The properties are described in Table 1.

EXAMPLE 6

10% by weight of polyphenylene sulphide D are admixed to pure polycarbonate B in a twin-screw extruder at 270° C. The mixture is extruded and granulated. Moldings of this mixture are injection-molded at 280° C. The properties are described in Table 1.

EXAMPLE 7

20% by weight of polyphenylene sulphide D are admixed to pure polycarbonate A in a twin-screw extruder at 250° C. The mixture is extruded and granulated. Moldings of this mixture are injection-molded at 270° C. The properties are described in Table 1.

EXAMPLE 8

5% by weight of polyphenylene sulphide D are admixed to pure polycarbonate C in a twin-screw extruder at 290° C. The mixture is extruded and granulated. Moldings of this mixture are injection-molded at 280° C. The properties are described in Table 1.

EXAMPLE 9

40% by weight of polyphenylene sulphide E (that is to say 24% by weight of pure polyphenylene sulphide and 16% by weight of glass fibers) are admixed to pure polycarbonate A in a twin-screw extruder at 250° C. The mixture is extruded and granulated. Moldings of this mixture are injection-molded at 280° C. The properties are described in Table 1.

TABLE 1

Properties from Examples 1 – 9

| | Dimension | DIN | Example 1 | Example 2 | Example 3 | Example 4 | Example 5 | Example 6 | Example 7 | Example 8 | Example 9 |
|---|---|---|---|---|---|---|---|---|---|---|---|
| Polycarbonate | % | | 100 | 100 | 100 | — | 98 | 90 | 80 | 95 | 60 |
| Polyphenylene sulphide | % | | — | — | — | 100 | 2 | 10 | 20 | 5 | 24 |
| Elongation at break | % | 53,455(1) | >120 | 100 | 110 | <9 | 105 | 98 | 107 | 115 | 4 |
| E-modulus | MPa | 53,457(2) | 2300 | 2400 | 2300 | 4390 | 2310 | 2420 | 2440 | 2500 | 3700 |
| Impact strength | KJ/m² | 53,453 | n.b.x) | n.b. | n.b. | 8 | n.b. | n.b. | n.b. | n.b. | 35 |
| Weld line strength | KJ/m² | | 88 | 80 | 90 | 7 | 80 | 78 | 74 | 77 | 7 |
| Notched impact strength | KJ/m² | 53,453 | >35 | 10 | 25 | 1 | 34 | 14 | 25 | 24 | 8 |
| Vicat B | °C | 53,460(3) | 153 | 160 | 154 | 227 | 150 | 148 | 147 | 152 | 150 |
| O₂ index | | ASTM-D 2863-70 | 0.24 | 0.24 | 0.34 | — | 0.27 | 0.33 | 0.35 | 0.35 | 0.33 |
| Burning test according to U.L. Subj. | 94 1/16" | | V II | V II | V II | — | V II | V II | V II | V O | V I |
| | 1/8" | | V II | V II | V O | — | V I | V I | V O | V O | V I |
| | 1/4 | | V I | V I | V O | — | V I | V O | V O | V O | V O |
| Hydrolysis resistance: | the impact strength after storage in boiling water is taken as a measure of the hydrolysis resistance | | | | | | | | | | |
| Impact strength after 100 hrs | KJ/m² | 53,453 | 3×92 7×n.b. | n.b. | n.b. | — | n.b. | n.b. | 2×50 8×n.b. | n.b. | 20 |
| 200 hrs | KJ/m² | " | 25 | 60 | 40 | — | 5×75 5×n.b. | 4×71 6×n.b. | 6×46 4×n.b. | 5×60 5×n.b. | 20 |
| 300 hrs | KJ/m² | " | 20 | 50 | 20 | — | 6×50 4×n.b. | 6×42 4×n.b. | 65 | 5×50 5×n.b. | 20 |
| 400 hrs | KJ/m² | " | 15 | 50 | 5 | — | 30 | 35 | 50 | 30 | 19 |
| 500 hrs | KJ/m² | " | 8 | 10 | 1 | — | 18 | 20 | 25 | 20 | 16 |

TABLE 1-continued

| | | Properties from Examples 1 - 9 | | | | | | | | |
|---|---|---|---|---|---|---|---|---|---|---|
| | Dimension | DIN | Example 1 | Example 2 | Example 3 | Example 4 | Example 5 | Example 6 | Example 7 | Example 8 | Example 9 |
| 700 hrs | KJ/m² | " | 8 | 10 | 1 | — | 15 | 17 | 25 | 10 | 14 |

*)Not broken = n.b.
(1)DIN 53,455 is directly comparable to ASTM D-638
(2)DIN 53,457 is comparable to ASTM D-638 tensile test, ASTM D-790 flexural test and ASTM D-695 compression text
(3)DIN 53,460 is similar to ASTM D-1525

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Thermoplastic polycarbonate molding materials based on high molecular weight, aromatic, thermoplastic polycarbonates having molecular weights, $\overline{M}_w$, of about 10,000 to 200,000, characterized in that they contain about 0.5 - 50% by weight of a polyphenylene sulphide, based on the total weight of polycarbonate + polyphenylene sulphide.

2. Molding materials according to claim 1, characterized in that the polyphenylene sulphide content is between about 2% by weight and 20% by weight.

3. Molding materials according to claim 1, characterized in that the polyphenylene sulphide content is between about 5% by weight and 10% by weight.

4. Thermoplastic molding materials according to claim 1, characterized in that aromatic polycarbonates based on 2,2-bis-(4-hydroxyphenyl)-propane (bisphenol A), 2,2-bis-(3,5-dibromo-4-hydroxyphenyl)-propane (tetrabromobisphenol A) and 2,2-bis-(3,5-dimethyl-4-hydroxyphenyl)-propane (tetramethylbisphenol A) are used.

5. Thermoplastic molding materials according to claim 1, characterized in that poly-1,4-phenylene sulphide with unsubstituted 1,4-phenylene groups is used.

6. A thermoplastic molding material comprising an intimate blend of
   a. an aromatic thermoplastic polycarbonate having a molecular weight, $\overline{M}_w$, of between about 10,000 and 200,000, and
   b. about 0.5 to 50 wt.% based on the total weight of the material of polyphenylene sulphide based on unsubstituted 1,4-phenylene and having a glass transition temperature of between about 85° and 95° C.

7. The material of claim 6, wherein the polycarbonate has a molecular weight, $\overline{M}_w$, of between about 20,000 and 80,000.

8. The material of claim 7, wherein the polycarbonate is based on monomers selected from the group consisting of 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

9. The material of claim 8, wherein the polycarbonate is based on at least about 70 mol% 2,2-bis-(4-hydroxyphenyl)-propane.

10. A process for improving the flame resistance and hydrolysis resistance of thermoplastic aromatic polycarbonates having molecular weights, $\overline{M}_w$, of between about 10,000 and 200,000 comprising intimately blending said polycarbonates with about 0.5 to 50 wt.% of polyphenylene sulphide.

* * * * *